United States Patent [19]

Kawakami

[11] Patent Number: 5,617,761
[45] Date of Patent: Apr. 8, 1997

[54] SHIFTING APPARATUS FOR A BICYCLE

[75] Inventor: Tatuya Kawakami, Sakai, Japan

[73] Assignee: Shimano, Inc., Osaka, Japan

[21] Appl. No.: 518,542

[22] Filed: Aug. 23, 1995

[30] Foreign Application Priority Data

Aug. 23, 1994 [JP] Japan ................................ 6-198081

[51] Int. Cl.$^6$ ..................... B62M 25/04; B62K 23/06
[52] U.S. Cl. ................... 74/475; 74/142; 74/489
[58] Field of Search ........................... 74/142, 475, 489, 74/502.2

[56] References Cited

U.S. PATENT DOCUMENTS

| | | | |
|---|---|---|---|
| 5,203,213 | 4/1993 | Nagano | 74/475 |
| 5,325,735 | 7/1994 | Nagano | 74/489 X |
| 5,355,745 | 10/1994 | Wu et al. | 74/489 X |

FOREIGN PATENT DOCUMENTS

| | | |
|---|---|---|
| 0352732A3 | 1/1990 | European Pat. Off. . |
| 0509457A1 | 10/1992 | European Pat. Off. . |
| 0609549A1 | 8/1994 | European Pat. Off. . |
| 5-319355 | 12/1993 | Japan ................... 74/489 |
| 589392 | 3/1994 | Japan ................... 74/489 |

OTHER PUBLICATIONS

European Search Report, Appl. No. EP 95 30 5807, Nov. 24, 1995.

*Primary Examiner*—Allan D. Herrmann
*Attorney, Agent, or Firm*—James A. Deland

[57] ABSTRACT

A first speed change lever is coupled to a take-up mechanism for causing the take-up mechanism to pivot for changing gears of the bicycle transmission in response to movement of the first speed change lever from a first position to a second position in the direction of a first axis. A second speed change lever is coupled to the take-up mechanism for causing the take-up mechanism to pivot for changing gears of the bicycle transmission in response to movement of the second speed change lever from a third position to a second position in the direction of a second axis that is different from the first axis. In a particular embodiment, the first axis is disposed generally parallel to the bicycle handlebar when the apparatus is mounted to the handlebar, and the second axis is disposed generally parallel to a longitudinal axis of the bicycle.

15 Claims, 9 Drawing Sheets

SHIFTING APPARATUS FOR A BICYCLE

BACKGROUND OF THE INVENTION

The present invention is directed to a shifting apparatus for a bicycle and, more particularly, to a shifting apparatus having first and second levers which cooperate with a take-up mechanism for alternately pulling and releasing a speed change member for changing gears of a bicycle transmission.

A conventional shifting apparatus of the above type is described in Japanese Patent Application Kokai No. 5-319355. Such a shifting apparatus is equipped with two speed-change levers which are capable of automatically returning to a start position. The speed-change wire is operated in the take-up direction by a thumb-operated speed-change lever, and the speed change wire is operated in the pay-out direction by a speed-change lever normally operated by an index finger. These two speed-change levers are supported so that the levers can pivot together about the vertical axis of the bicycle body. The finger-contact operating part of the speed-change lever which is operated with the thumb pivots in the forward-backward direction underneath the handlebar. This lever is arranged so that, when the operating part pivots toward the handlebar, the speed-change wire is operated in the take-up direction. The finger-contact operating part of the speed-change lever which is operated with the index finger also pivots in the forward-backward direction underneath the handlebar. This lever is similarly arranged so that, when the operating part pivots toward the handlebar, the speed-change wire is operated in the pay-out direction.

If the respective directions of operating movement of the finger-contact operating parts of the two speed-change levers in the conventional speed-change operating mechanism are considered, it will be understood that the finger-contact operating part of the speed-change lever which is operated with the index finger moves in the same manner as the trigger in a pistol. Thus, the operating part can be operated by a relatively natural movement of the index finger. However, the finger-contact operating part of the speed-change lever which is operated with the thumb is operated by pushing the finger-contact operating part toward the handlebar (i.e., toward the front underneath the handlebar). As a result, especially in the initial stage of operation, it is necessary to push the finger-contact operating part toward the front with the palm of the hand slightly removed from the grip part of the handlebar. When the shifting apparatus is mounted to a mountain bike, for example, which is used for riding in rough off-road areas, considerable difficulty is involved in the speed-change operation performed with the thumb during riding.

SUMMARY OF THE INVENTION

The present invention is directed to a shifting apparatus for a bicycle wherein speed changes may be effected with little, if any, need to separate the palm of the hand from the handlebar, even during rough riding. In one embodiment of the present invention, a first speed change lever is coupled to a take-up mechanism for causing the take-up mechanism to pivot for changing gears of the bicycle transmission in response to movement of the first speed change lever from a first position to a second position in the direction of a first axis. A second speed change lever is coupled to the take-up mechanism for causing the, take-up mechanism to pivot for changing gears of the bicycle transmission in response to movement of the second speed change lever from a third position to a fourth position in the direction of a second axis that is different from the first axis. In a particular embodiment, the first axis is disposed generally parallel to the bicycle handlebar when the apparatus is mounted to the handlebar, and the second axis is disposed generally parallel to a longitudinal axis of the bicycle. Furthermore, the first lever includes a first operator contacting portion which is disposed beneath the handlebar for the entire range of movement of the first lever. The second lever includes a second operator contacting portion which is disposed in front of the handlebar at approximately the same level as the handlebar for the entire range of movement of the second lever. In this embodiment, the resulting feeling of operation of the first lever is similar to that of operating a knock type ball valve, etc, whereas the resulting feeling of operation of the second lever is similar to that of a trigger of a pistol. These modes of operation feel much more natural than with conventional shifters. Furthermore, the apparatus operates much more easily and safely, since it is not necessary to remove the palm of the hand from the handlebar.

If desired, the first and second levers may be pivotally coupled to the take-up mechanism so that the first lever pivots about an axis that is oriented generally perpendicular to the first axis, and the second lever may be pivotally coupled to the take-up mechanism so that the second lever pivots about an axis that is oriented generally perpendicular to the second axis. The first lever may be coupled to the take-up mechanism so that movement of the first lever causes the take-up mechanism to pull the speed change member, and the second lever may be coupled to the take-up mechanism so that movement of the second lever causes the take-up mechanism to release the speed-change member. Thus, if the first lever is adapted to be operated with the thumb, the take-up operation, which requires a larger operating force, can be accomplished using the thumb, which allows an easier application of force. Furthermore, each lever may include a biasing mechanism for automatically returning the first and second levers to respective starting positions after the levers are operated.

DETAILED DESCRIPTION OF THE EMBODIMENTS

Figure 1:
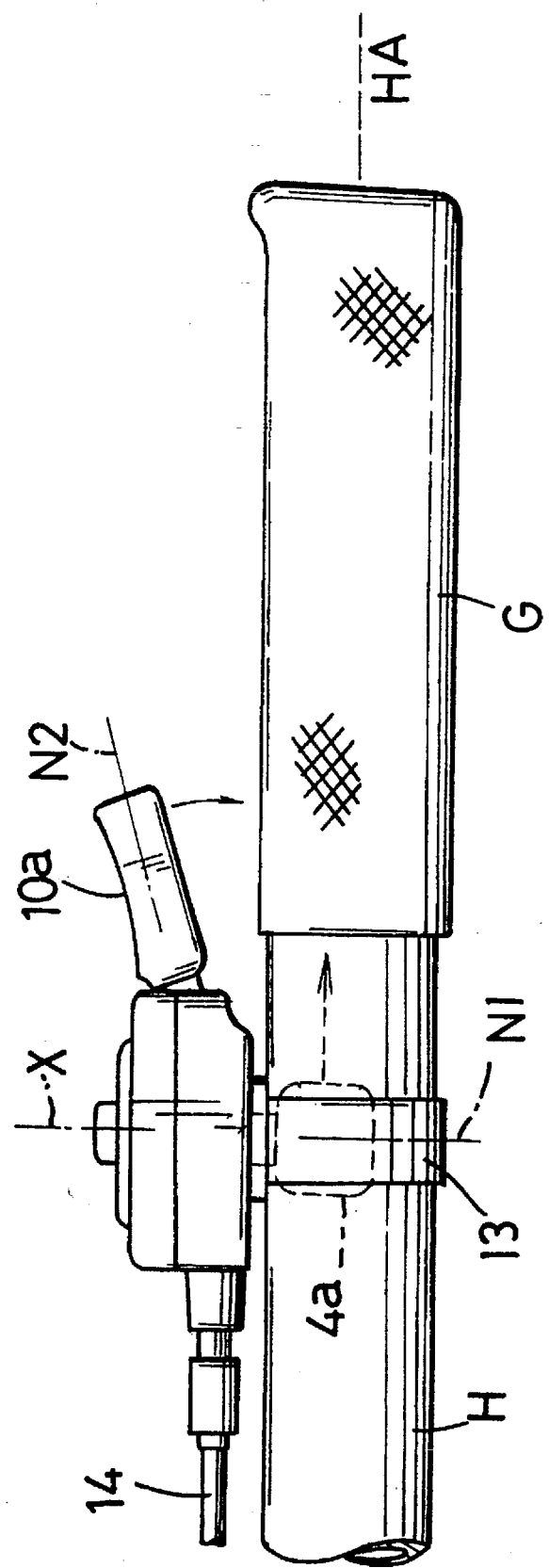
FIG. 1 is a plan view showing a particular embodiment of a shifting apparatus according to the present invention attached to a handlebar.
Figure 2:
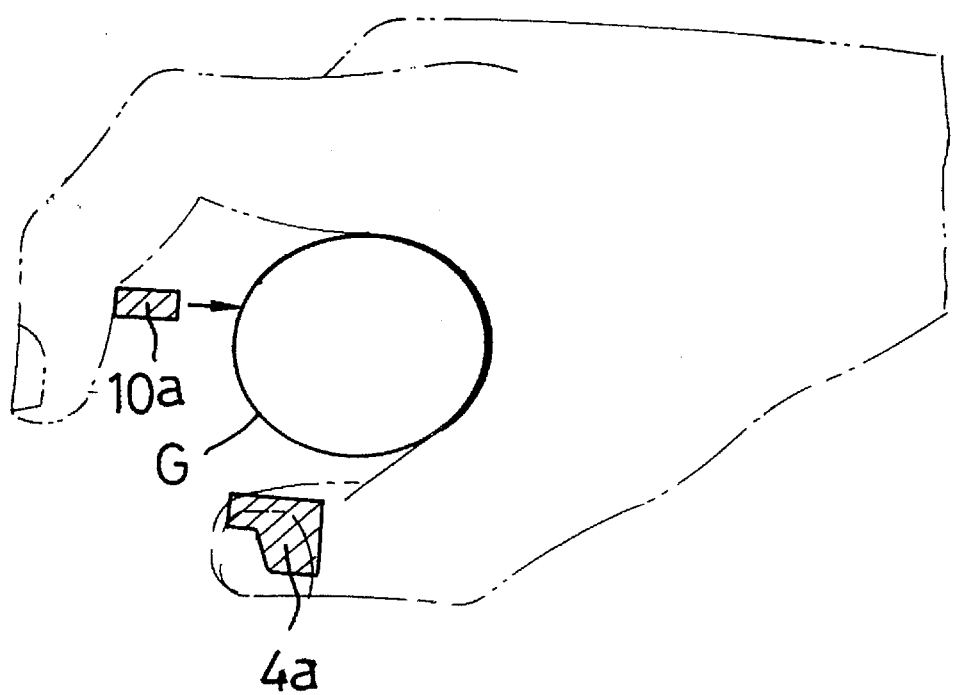
FIG. 2 is a side view showing a particular embodiment of the positional relationship of the operating levers of the shifting apparatus shown in FIG. 1.
Figure 3:
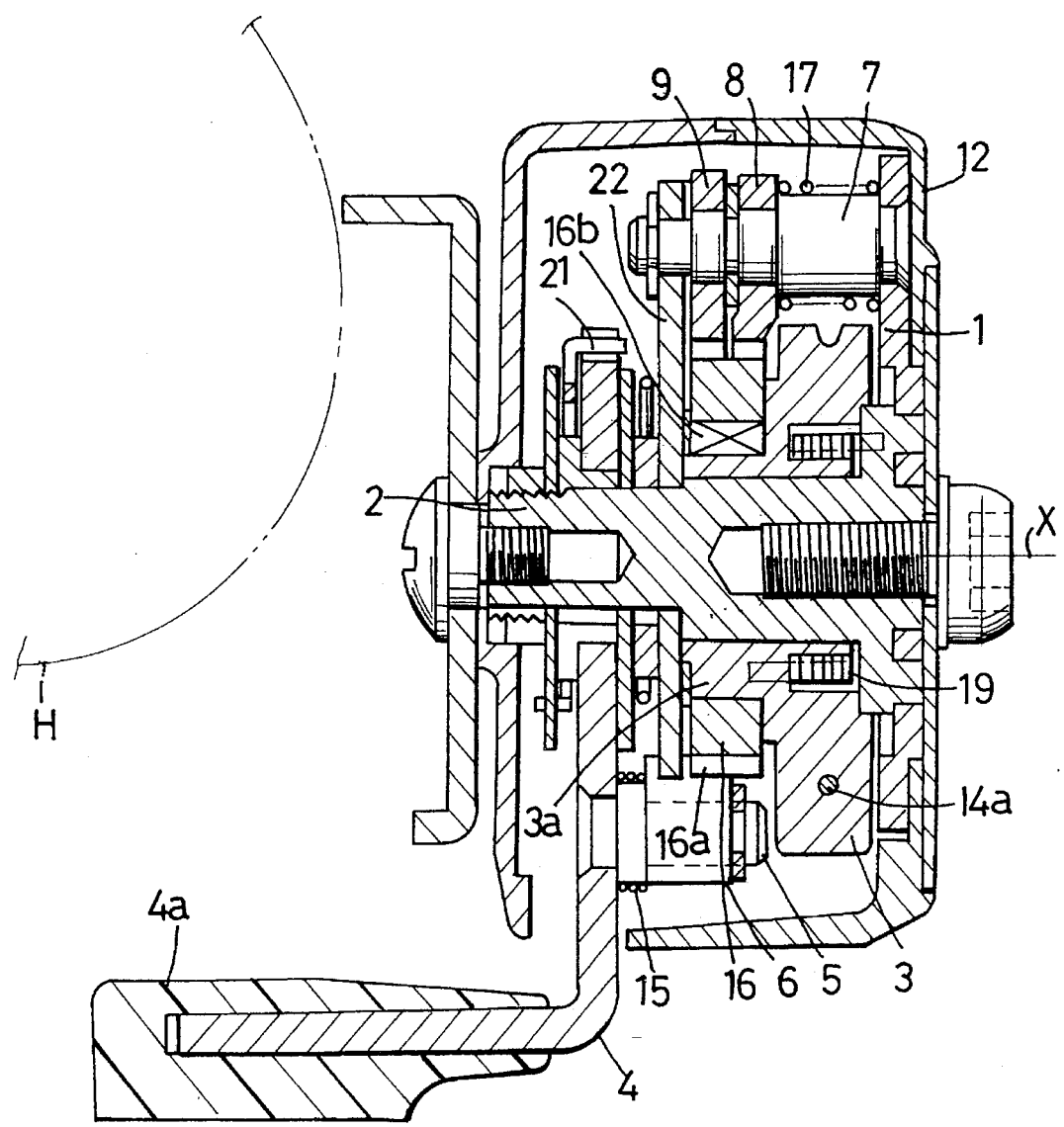
FIG. 3 is a cross sectional view of a particular embodiment of the shifting apparatus shown in FIG. 1.

FIG. 1 is a plan view showing a particular embodiment of a shifting apparatus according to the present invention attached to a handlebar (H). The shifting apparatus can be used to operate various types of speed-change mechanisms (not shown in the figures) such as rear (rear-wheel hub inside- or outside-mounted) or front mechanisms, etc. As shown in FIG. 3, a take-up part 3 is pivotally attached to a supporting member 1 via a supporting shaft 2 which is attached to the supporting member 1 so that the supporting shaft 2 is not free to rotate. A take-up lever 4 is pivotally attached to the supporting shaft 2 via a one-way mechanism (described later) as a first speed-change lever which causes the take-up part to pivot toward the take-up side, and which automatically returns to its original position. The system is constructed so that this take-up lever 4 and the take-up part 3 both pivot about the axis X of the supporting shaft 2.

A pawl supporting shaft 5 is fastened to the take-up lever 4, and a feed pawl 6 for the take-up part 3 is pivotally attached to the pawl supporting shaft 5. A first positioning pawl 8 and a second positioning pawl 9 are respectively pivotally attached to the supporting member 1 via a pawl supporting shaft 7 which is fastened to the supporting member 1. The take-up part 3 pivots in the pay-out direction through the pivoting operation of the first positioning pawl 8 and second positioning pawl 9 in response to a release lever 10 which is used as the second speed-change lever. Lever 10 is constructed so that it is free to pivot about a supporting shaft 11 which is attached to the supporting member 1 and which has an axis Y that is perpendicular to the axis X of the supporting shaft 2. Axis Y does not intersect the axis X. Lever 10 is also arranged so that it automatically returns to its original position.

The supporting member 1, the take-up part 3, both positioning pawls 8 and 9 and the base end portions of both levers 4 and 10, etc., are covered by a cover 12, thus forming a bicycle speed-change operating mechanism. As shown in FIGS. 1 and 3, this speed-change operating mechanism is attached to the handlebar H by means of an attachment band 13 which is connected to the supporting member 1 so that the axis X of the supporting shaft 2 which supports the take-up lever 4 is oriented in the longitudinal direction of the bicycle body. Furthermore, the inner wire 14a of a speed-change wire 14 from any of various types of speed-change mechanisms (not shown in the figures) is connected to the take-up part 3 so that the switching of the speed-change mechanism is accomplished by pulling or releasing the speed-change wire 14.

Figure 4:
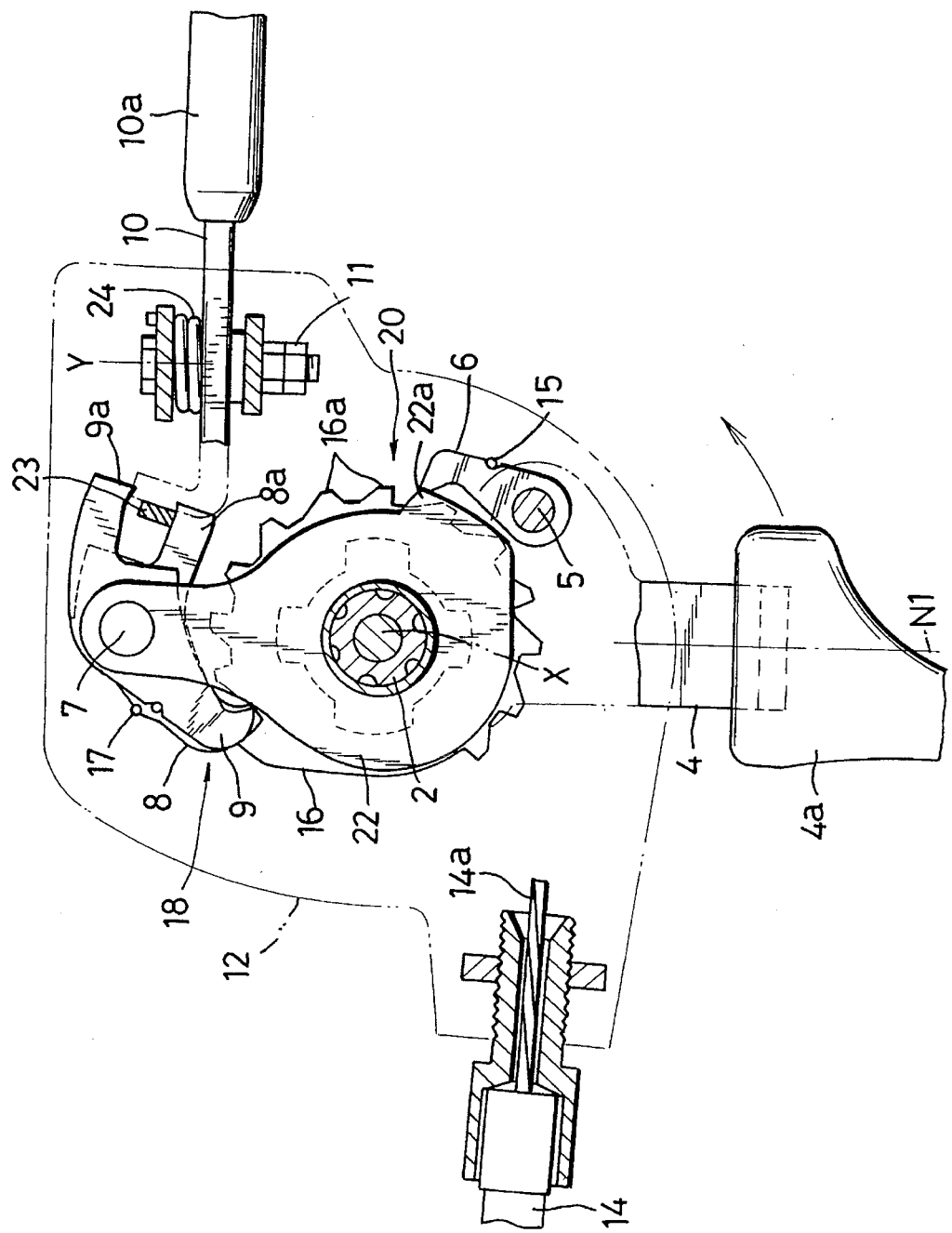
FIG. 4 is an internal view of the shifting apparatus shown in FIG. 1 illustrating an operation of the shifting apparatus.

A finger-contact operating part 4a consisting of a plastic lever cap is installed on the take-up lever 4. When the finger-contact operating part 4 is pushed with the thumb (while gripping the grip part G of the handlebar H) so that the operating part 4 is caused to pivot about the axis X, i.e., when the operating part 4 is pushed toward the grip part G along the axis HA (FIG. 1) of the handlebar H at an installation level lower than the handlebar H, the take-up lever 4 is caused to move toward the grip part G (in the direction indicated by the arrow) from its original position N1 as shown in FIG. 4. As a result, the inner wire 14a of the speed-change wire 14 is taken up.

Figure 5:
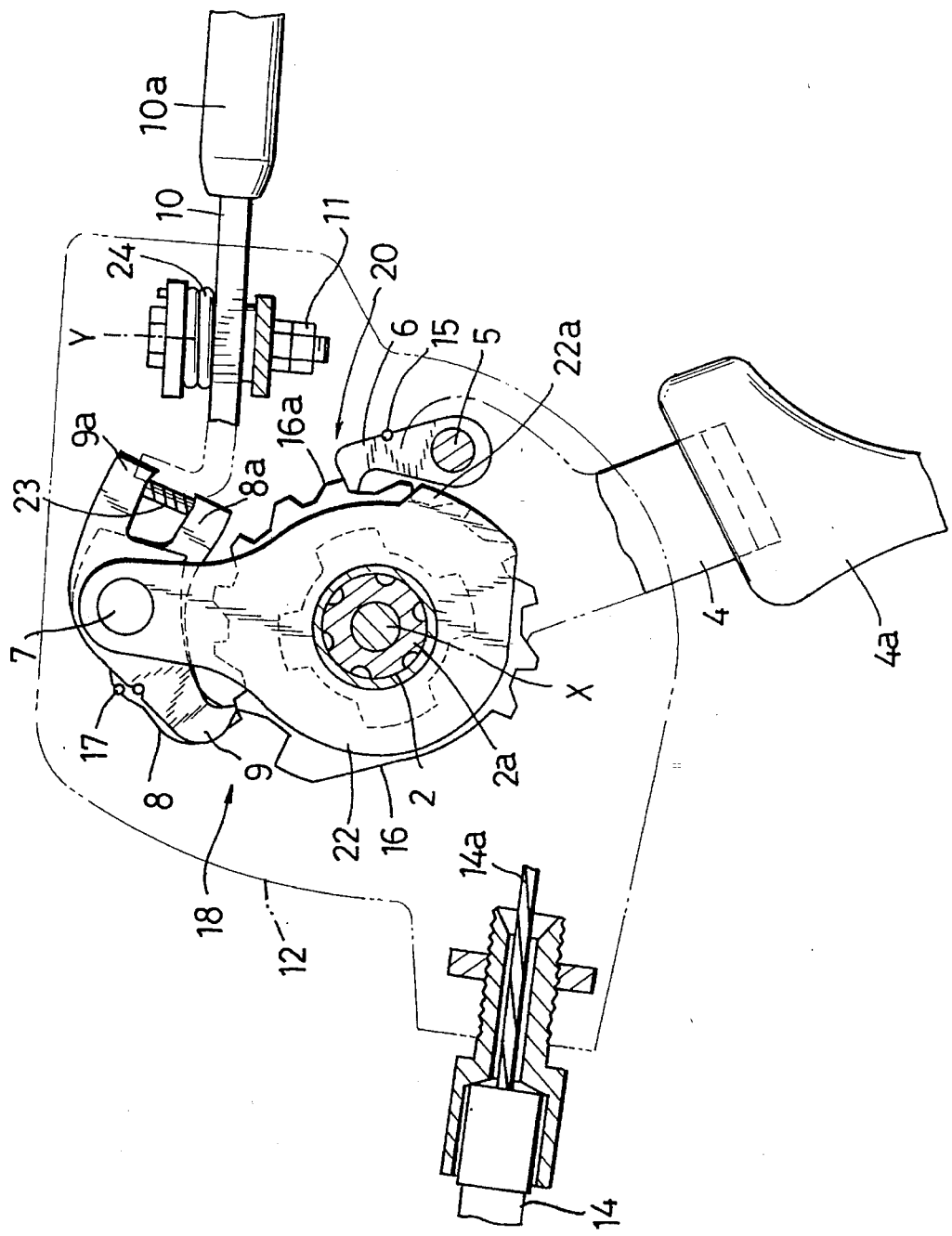
FIG. 5 is an internal view of the shifting apparatus shown in FIG. 1 illustrating a further operation of the shifting apparatus.

More specifically, when the take-up lever 4 is pushed toward the grip part G from the original position N1 as indicated by the arrow in FIG. 4, the driving action of a feed pawl spring 15 causes the feed pawl 6 to engage with one of the ratchet teeth 16a of a positioning member 16 which is attached via splines 16b to splines 3a on the boss part of the take-up part 3 so that the positioning member 16 rotates as a unit with the take-up part 3 as shown in FIG. 5. When this occurs, the first positioning pawl 8 and second positioning pawl 9 are caused to slip from the ratchet teeth 16a by a pushing action originating in the shape of the ratchet teeth 16a. As a result, the take-up part 3 is caused to pivot toward the take-up side via the positioning member 16, so that the inner wire 14a is taken up.

When the take-up lever 4 is thus caused to pivot through a prescribed angle, the wire take-up stroke performed by the take-up part 3 reaches a prescribed stroke, so that the speed-change mechanism is switched to a desired speed state which is higher than the speed state of the speed-change mechanism prior to the speed-change operation. At this time, the driving action of a pawl spring 17 causes the first positioning pawl 8 to engage with one of the ratchet teeth 16a, so that the take-up part 3 is maintained in the desired target position of the speed-change operation.

Figure 8:
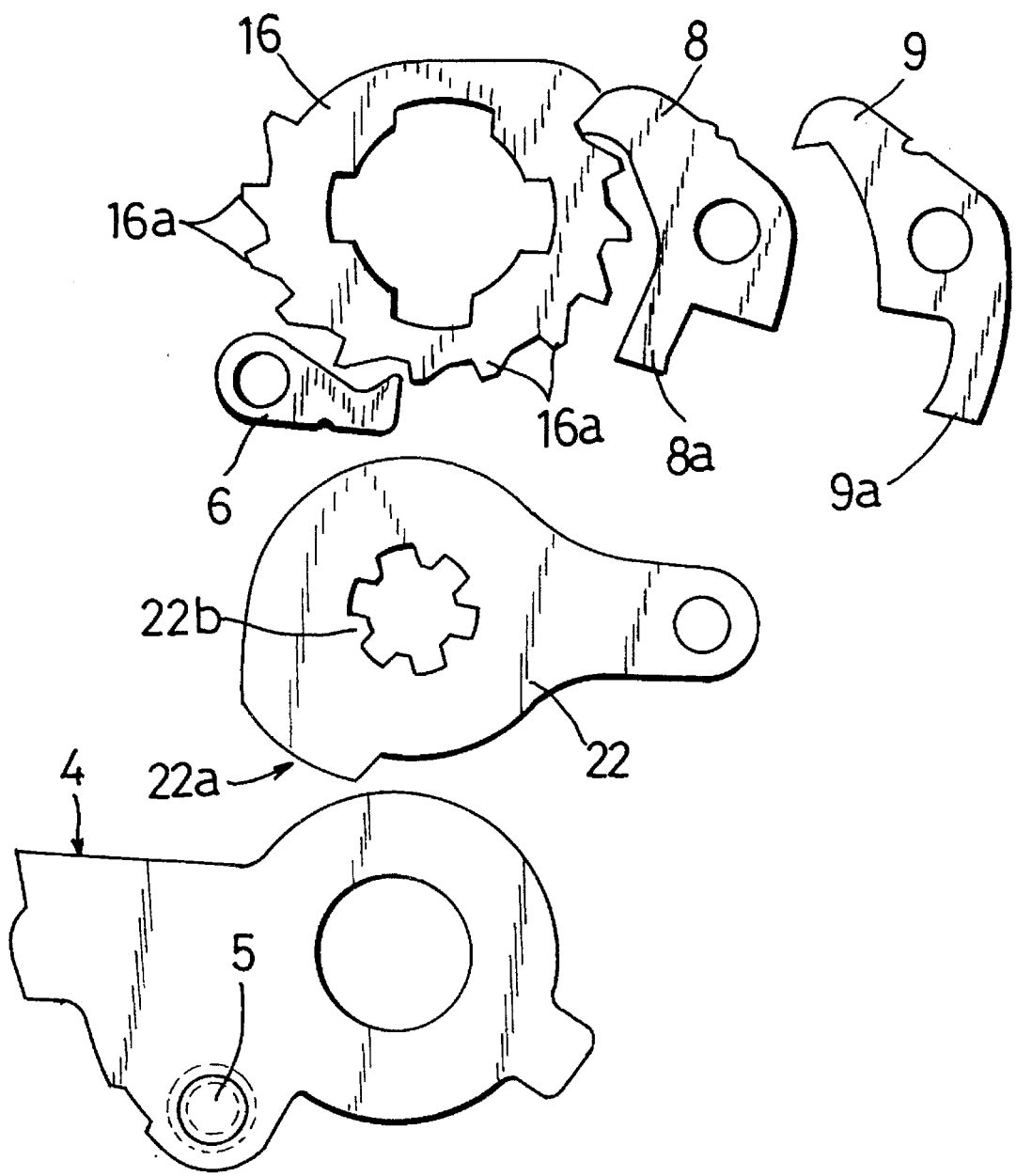
FIG. 8 is an exploded view of some of the components shown in FIGS. 4–5.

The take-up lever 4 is linked with the take-up part 3 via a one-way mechanism 20 consisting of the feed pawl 6 and positioning member 16, etc.. Thus, when the operating force applied to the take-up lever 4 is released, the take-up lever 4 automatically returns to the original position N1 by the driving force of a return spring 21. When the lever 4 is returned to the original position N1, the tip of the feed pawl 6 rides over the guide part 22a of a guide member 22 which is attached via splines 22b (FIG. 8) to splines 2a (FIG. 5) of the supporting shaft 2 so that the guide member 22 cannot pivot. As a result, the linkage with the take-up part 3 is broken so that rotation of the take-up part 3 (described later) becomes possible.

A finger-contact operating part 10a consisting of a plastic lever cap is also installed on the lever 10. In general, when the finger-contact operating part 10a is pushed with the index finger (while the grip part G of the handlebar H is gripped) so that the operating part 10a is caused to pivot about the axis Y, i.e., when the operating part 10a is pulled toward the handlebar H through an area located on the front side of the handlebar H at the same installation level as the handlebar H, the release lever 10 is caused to move toward the handlebar H in the direction of axis X from its original position N2. As a result, the inner wire 14a of the speed-change wire 14 is released so that the speed is shifted down by one speed.

Figure 6:
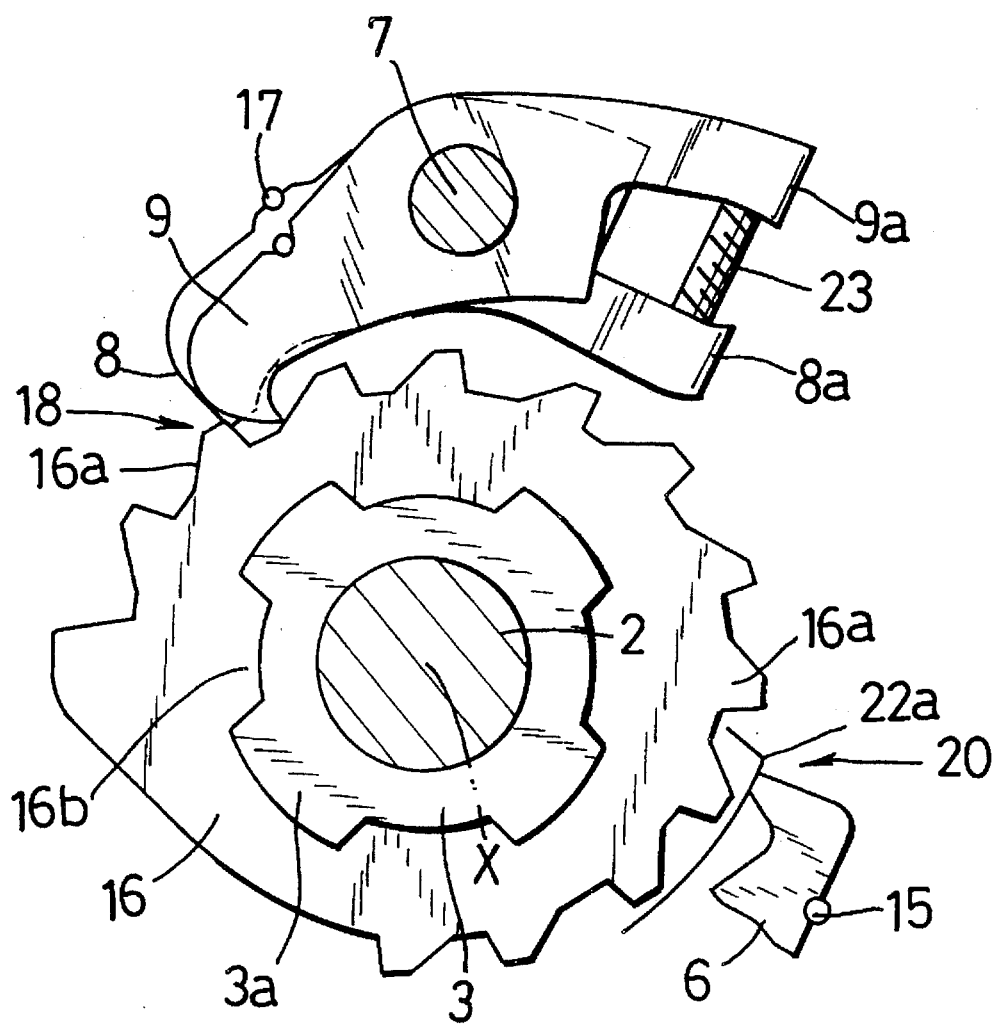
FIG. 6 is a more detailed view of some of the components illustrated in FIGS. 4–5 illustrating an operation of the shifting apparatus.
Figure 9:
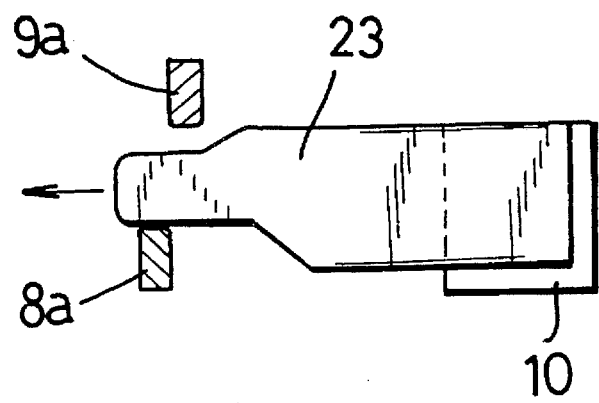
FIG. 9 is a diagram illustrating the movement of the release lever in FIGS. 4–5.

More specifically, when the lever 10 is pulled toward the handlebar H from the original position N2, a tapered release member 23 which protrudes from the lever 10 as an integral part of the lever 10 enters the area between the arm portion 8a of the first positioning pawl 8 and the arm portion 9a of the second positioning pawl 9, and pushes against the arm portion 9a of the second positioning pawl 9 as shown in FIG. 5. As a result, the pawl tip of the second positioning pawl 9 enters the space between two ratchet teeth 16a as shown in FIG. 6. In this case, the pawl tip of the first positioning pawl 8 contacts one of the ratchet teeth 16a, thus maintaining the take-up part 3 in position so that the take-up part 3 does not pivot. For more detail of the structure and operation of these components, see FIGS. 8 and 9.

Figure 7:
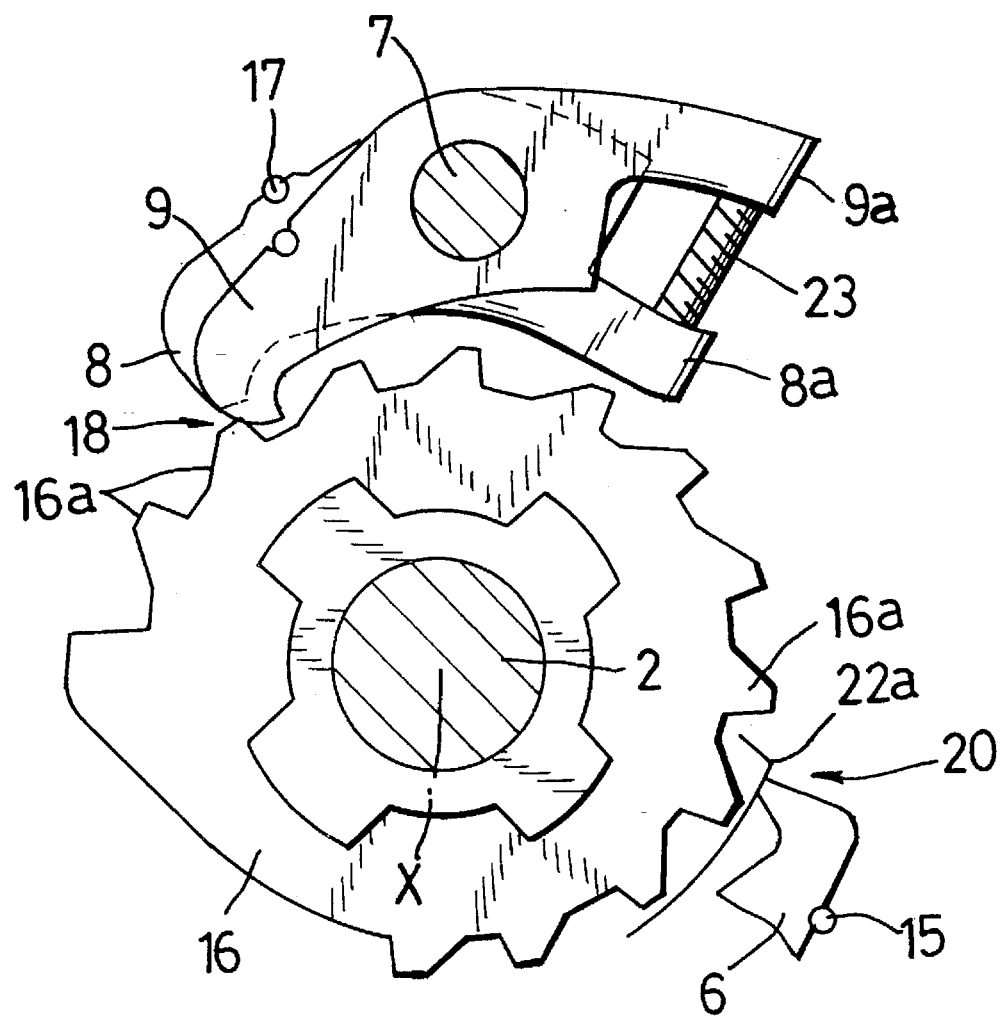
FIG. 7 is another view of some of the components illustrated in FIGS. 4–5 illustrating a further operation of the shifting apparatus.

When the lever 10 is pulled even further toward the handlebar H so that the lever 10 reaches a prescribed position, the release member 23 pushes against the arm portion 8a of the first positioning pawl 8 as shown in FIG. 7, so that the pawl tip of the first positioning pawl 8 is caused to slip from the ratchet tooth 16a with which it was previously in contact. As a result, the take-up part 3 pivots slightly in the direction as a result of the driving action of a spring 19 and the wire pulling action of the speed-change mechanism. In this case, as is shown in FIG. 7, the ratchet tooth 16a which has just slipped from the first positioning pawl 8 contacts the pawl tip of the second positioning pawl 9, so that pivoting of the take-up part 3 in the direction is immediately checked.

When the operating force applied to the lever 10 is released, the lever 10 is automatically returned to the original position N2 by the driving action of a return spring 24. At the same time, the pushing of the release member 23 against the arm portion 9b of the second positioning pawl 9 is released. As a result, the second positioning pawl 9, because of the shape of its tip, is caused to slip from the ratchet teeth 16a of the pivoting take-up part 3 as a result of the pushing action of the ratchet teeth 16a. Accordingly, the take-up part 3 pivots in the direction, and when the wire stroke accomplished by the take-up part 3 reaches a prescribed stroke, the speed-change mechanism is switched to a speed state which is one speed lower than the speed state of the mechanism prior to the speed-change operation.

Afterward, as a result of the driving action of the pawl spring 17, the pawl tip of the first positioning pawl 8 enters the space between the rachet tooth 16a from which the first positioning pawl 8 previously slipped and the ratchet tooth 16a which follows the first ratchet tooth 16a, and the pawl tip contacts the following ratchet tooth 16a, so that the take-up part is maintained in the new speed state following switching.

In the above embodiment, a mechanism was described which had a structure in which the finger-contact operating part 4a of the take-up lever 4 performed a reciprocating motion at a lower installation level than the handlebar H throughout the entire range of movement of the operating part 4a (with the speed-change operating mechanism attached to the handlebar H). However, it would also be possible to construct the mechanism so that the operating part 4a performs a reciprocating motion at the same installation level as the handlebar throughout the entire range of movement of the operating part 4a, or to embody the mechanism so that one portion of the range of movement of the operating part 4a is at a lower installation level as the handlebar H, while another portion of the range of movement is at the same installation level than the handlebar H.

In regard to the finger-contact operating part 10a of the lever 10 as well, it would also be possible to construct the mechanism so that the operating part 10a performs a reciprocating motion at an installation level lower than the handlebar H throughout the entire range of movement of the operating part 10a, or to embody the mechanism so that one portion of the range of movement of the operation part 10a is at the same installation level as the handlebar H, while another portion of the range of movement is lower than the installation level of the handlebar.

In regard to the concrete structures of the take-up lever 4 and lever 10, a mechanism was described in which both levers 4 and 10 were constructed as pivoting levers. However, this mechanism could be embodied using various structures. For example, both of the levers 4 and 10 could be constructed as sliding levers, or one of the levers could be constructed as a pivoting lever while the other lever is constructed as a sliding lever, etc. Additionally, either of the levers can function as the take-up lever, and the other lever can function as the release lever.

It should also be noted that the specific structure of the take-up mechanism may be varied in many ways, as long as the directions of operational movement of the finger-contact operating parts 4a and 10a are generally maintained. Accordingly, the scope of the invention should not be limited by the specific embodiments disclosed. Instead, the scope of the invention should be determined by the following claims.

What is claimed is:

1. A shifting apparatus for a bicycle comprising:

a supporting member (1) for connecting to a handlebar (H);

a take-up pan (3) which is pivotally supported to the supporting member (1) for alternately pulling and releasing a speed change member (14) for changing gears of a bicycle transmission;

a first speed change lever (4) coupled to the take-up part (3) for causing the take-up part (3) to pivot for changing gears of the bicycle transmission in response to movement of the first speed change lever (4) from a first position (N1) to a second position in the direction of a first axis (HA);

a second speed change lever (10) coupled to the take-up part (3) for causing the take-up part (3) to pivot for changing gears of the bicycle transmission in response to movement of the second speed change lever (10) from a third position (N2) to a fourth position in the direction of a second axis (X); and an attachment band (13) for attaching the supporting member (1) to the handlebar (H), wherein the first axis (HA) is perpendicular to a plane defined by the attachment band, and wherein the second axis (X) is oriented generally perpendicularly to the first axis.

2. The apparatus according to claim 1 further comprising:

a first biasing mechanism for automatically returning the first speed change lever (4) to the first position (N1) after the first speed change lever is moved to the second position; and a second biasing mechanism for automatically returning the second speed change lever (10) to the third position (N2) after the second speed change lever is moved to the fourth position.

3. A shifting apparatus for a bicycle comprising:

supporting member (1) for connecting to a handlebar (H);

a take-up part (3) which is pivotally supported to the supporting member (1) for alternately pulling and releasing a speed change member (14) for changing gears of a bicycle transmission;

a first speed change lever (4) coupled to the take-up part (3) for causing the take-up part (3) to pivot for changing gears of the bicycle transmission in response to movement of the first speed change lever (4) from a first position (N1) to a second position in the direction of a first axis (HA);

a second speed change lever (10) coupled to the take-up part (3) for causing the take-up part (3) to pivot for changing gears of the bicycle transmission in response to movement of the second speed change lever (10) from a third position (N2) to a fourth position in the direction of a second axis (X);

wherein the first lever (4) includes a first operator contacting portion (4a) which is disposed beneath the handlebar (H) when the apparatus is mounted to the handlebar; and wherein the second lever (10) includes a second operator contacting portion (10a) which is disposed in front of the handlebar (H) at approximately the same level as the handlebar (H) when the apparatus is mounted to the handlebar (H).

4. The apparatus according to claim 3 wherein the first lever (4) includes a first operator contacting portion (4a) which is disposed beneath the handlebar (H) for the entire range of movement of the first lever (4), and wherein the second operator contacting portion (10a) is disposed at approximately the same level of the handlebar (H) for the entire range of movement of the second lever (10).

5. A shifting apparatus for a bicycle comprising:

a supporting member (1) for connecting to a handlebar (H);

a take-up part (3) which is pivotally supported to the supporting member (1) for alternately pulling and releasing a speed change member (14) for changing gears of a bicycle transmission;

a first speed change lever (4) coupled to the take-up part (3) for causing the take-up part (3) to pivot for changing gears of the bicycle transmission in response to movement of the first speed change lever (4) from a first position (N1) to a second position in the direction of a first axis (HA);

a second speed change lever (10) coupled to the take-up part (3) for causing the take-up part (3) to pivot for changing gears of the bicycle transmission in response to movement of the second speed change lever (10) from a third position (N2) to a fourth position in the direction of a second axis (X); and wherein the first lever (4) is pivotally coupled to the supporting member (1) so that the first lever (4) pivots about an axis (X) that is oriented generally perpendicular to the first axis (HA), and wherein the second lever (10) is pivotally coupled to the supporting member (1) so that the second lever (10) pivots about an axis (Y) that is oriented generally perpendicular to the second axis (X).

6. A shifting apparatus for a bicycle comprising:

a supporting member (1) for connecting to a handlebar (H);

a take-up part (3) which is pivotally supported to the supporting member (1) and which alternately pulls and releases a speed change member (14) for changing gears of a bicycle transmission;

a first speed change lever (4) coupled to the take-up part (3) for causing the take-up part (3) to pivot for changing gears of the bicycle transmission in response to movement of the first speed change lever (4) from a first position (N1) to a second position in the direction of a first axis (HA) disposed generally parallel to the handlebar (H) when the apparatus is mounted to the handlebar;

a second speed change lever (10) coupled to the take-up part (3) for causing the take-up part (3) to pivot for changing gears of the bicycle transmission in response to movement of the second speed change lever (10) from a third position (N2) to a fourth position in the direction of a second axis (X) disposed generally parallel to a longitudinal axis of the bicycle.

7. The apparatus according to claim 6 wherein the first lever (4) includes a first operator contacting portion (4a) which is disposed beneath the handlebar (H) when the apparatus is mounted to the handlebar (H).

8. The apparatus according to claim 7 wherein the second lever (10) includes a second operator contacting portion (10a) which is disposed in front of the handlebar (H) at approximately the same level as the handlebar (H) when the apparatus is mounted to the handlebar (H).

9. The apparatus according to claim 8 wherein the first operator contacting portion (4a) is disposed beneath the handlebar (H) for the entire range of movement of the first lever (4); and wherein the second operator contacting portion (10a) is disposed at approximately the same level of the handlebar (H) for the entire range of movement of the second lever (10).

10. The apparatus according to claim 9 further comprising:

a first biasing mechanism for automatically returning the first speed change lever (4) to the first position (N1) after the first speed change lever is moved to the second position; and a second biasing mechanism for automatically returning the second speed change lever (10) to the third position (N2) after the second speed change lever is moved to the fourth position.

11. The apparatus according to claim 9 wherein the first lever (4) is pivotally coupled to the supporting member (1) so that the first lever (4) pivots about an axis (X) that is oriented generally perpendicular to the first axis (HA), and wherein the second lever (10) is pivotally coupled to the supporting member (1) so that the second lever (10) pivots about an axis (Y) that is oriented generally perpendicular to the second axis (X).

12. The apparatus according to claim 9 wherein the first lever (4) is coupled to the take-up part (3) so that movement of the first lever (4) from the first position (N1) to the second position causes the take-up part (3) to pull the speed change member (14), and wherein the second lever (10) is coupled to the take-up part (3) so that movement of the second lever (10) from the third position (N2) to the fourth position causes the take-up part (3) to release the speed-change member (14).

13. A shifting apparatus for a bicycle comprising:

a handlebar (H) having a grip pan (G);

a supporting member (1) connected to the handlebar (H) in close proximity to the grip part (G);

a take-up part (3) which is pivotally supported to the supporting member (1) and which alternately pulls and pays out a speed change wire (14a) for changing gears of a bicycle transmission;

a first speed change lever (4) with a first finger-contacting part (4a) disposed in close proximity to the handlebar (H), wherein the first speed change lever (1) is coupled to the supporting member (1) so that the first finger-contacting part (4a) is capable of reciprocating motion between a first position (N1) and a second position in the direction of a first axis (HA) disposed generally parallel to the handlebar (H), and wherein the first speed change lever (4) is coupled to the take-up part (3) through a one-way transmission means (20) for causing the take-up part (3) to pivot for pulling the speed change wire (14a) as the first finger-contacting part (4a) moves toward the grip part (G) from the first position (N1) toward the second position;

positioning means (18) for maintaining the position of the take-up part (3);

a second speed change lever (10) having a second finger-contacting part (10a) disposed in from of the handlebar (H), wherein the second speed-change lever (10) is coupled to the supporting member (1) for reciprocating forward and backward motion between a third position (N2) and a fourth position in the direction of a second axis (X) disposed generally parallel to a longitudinal axis of the bicycle, and wherein the second speed-change lever (10) is coupled for selectively releasing the positioning means (18) in response to movement of the second speed change lever (10) toward the handlebar (H) from the third position (N2) to the fourth position for causing the take-up part (3) to pivot for paying out the speed-change wire (14*a*);

a first biasing mechanism for automatically returning the first speed change lever (4) to the first position (N1) after the first speed change lever is moved to the second position; and a second biasing mechanism for automatically returning the second speed change lever (10) to the third position (N2) after the second speed change lever is moved to the fourth position.

14. The apparatus according to claim 13 wherein the first finger-contacting portion (4*a*) is disposed beneath the handlebar (H) for the entire range of movement of the first lever (4), and wherein the second finger-contacting portion (10*a*) is disposed at approximately the same level as the handlebar (H) for the entire range of movement of the second lever (10).

15. The apparatus according to claim 13 wherein the first lever (4) is pivotally coupled to the support member (1) so that the first lever (4) pivots about art axis (X) that is oriented longitudinally of the bicycle, and wherein the second lever (10) is pivotally coupled to the support member (1) so that the second lever (10) pivots about a vertical axis (Y).

* * * * *